United States Patent [19]

Tuhro et al.

[11] Patent Number: 5,437,441
[45] Date of Patent: Aug. 1, 1995

[54] MAIL PREPARATION COPIER WITH MAILING ADDRESS IDENTIFICATION

[75] Inventors: Richard H. Tuhro; James S. Hutchinson, both of Webster, N.Y.

[73] Assignee: Xerox Corportion, Stamford, Conn.

[21] Appl. No.: 134,503

[22] Filed: Oct. 12, 1993

Related U.S. Application Data

[63] Continuation of Ser. No. 961,772, Oct. 16, 1992, abandoned.

[51] Int. Cl.⁶ .................. B41F 13/54; G06K 9/20; G06F 15/20
[52] U.S. Cl. ..................... 270/1.1; 270/45; 382/101; 364/478; 364/464.02
[58] Field of Search ............ 270/1.1, 32, 45, 4, 270/8, 18; 53/131.2, 131.4, 569, 284.3, 411; 382/1, 48; 364/478, 464.01, 464.02

[56] References Cited

U.S. PATENT DOCUMENTS

| | | | |
|---|---|---|---|
| 3,594,495 | 7/1971 | Bond | 178/5 |
| 4,168,533 | 9/1979 | Schwartz | 364/464.02 X |
| 4,285,050 | 8/1981 | Muller . | |
| 4,345,276 | 8/1982 | Colomb . | |
| 4,397,542 | 8/1983 | Brodesser . | |
| 4,471,386 | 9/1984 | Tuhro . | |
| 4,542,378 | 9/1985 | Suganuma et al. . | |
| 4,627,222 | 12/1986 | Cantile . | |
| 4,675,498 | 6/1987 | Lemelson | 219/121 LB |
| 4,680,643 | 7/1987 | Horiguchi . | |
| 4,733,359 | 3/1988 | Luperti et al. | 364/478 |

(List continued on next page.)

FOREIGN PATENT DOCUMENTS

| | | |
|---|---|---|
| 0507562 | 10/1992 | European Pat. Off. . |
| 57-74740 | 5/1982 | Japan . |
| 59-103460 | 6/1984 | Japan . |
| 60-224375 | 11/1985 | Japan . |
| 2160056 | 12/1985 | United Kingdom . |

OTHER PUBLICATIONS

"Modern Office Procedures", May 1983, pp. 92-96.
Shapiro, N., "The Envelope Please", MacWeek, vol. 4, No. 27, Aug. 7, 1990, pp. 126-130.
"MacIntosh System Software User's Guide Version 6.0", Apple Computer, 1988, pp. 8-10.
Bermant, Charles, "The List is in the Mail", PC Computings, vol. 2, No. 8, Aug. 1989, p. 44.

*Primary Examiner*—John E. Ryznic
*Attorney, Agent, or Firm*—Mark Costello

[57] ABSTRACT

A digital copier with mail preparation functions including a document input scanner deriving an electronic representation of an original document placed at a scanning position associated therewith; a document editor, responsive to operator command from a user interface to identify in, an original document an area thereof including an address; a document creator, for combining the image from the identified area with a pre-stored envelope image; a source of sheets and envelopes; means for selectively feeding sheets and envelopes from the source to a printer; the printer is controlled to create an image on the selected sheet or envelope in accordance with the created envelope image. Such an arrangement additionally includes postage amount generation responsive to received information about the weight of a document; a character generator, responsive to the postage amount generation to create data representing an image of the postage amount; the document creator combining the image data from the character generator with the envelope image, to generate an envelope image with a postage amount. A digital copier with mail room applications as described above may additionally include postage accounting responsive to the postage amount generation for deducting from a previously determined postage sum an amount printed on printed on the envelope, to maintain a running total of the postage sum.

7 Claims, 11 Drawing Sheets

U.S. PATENT DOCUMENTS

| | | | |
|---|---|---|---|
| 4,760,534 | 7/1988 | Fougere et al. | 364/466 |
| 4,777,510 | 10/1988 | Russel . | |
| 4,797,830 | 1/1989 | Baggarly et al. | 364/464.03 |
| 4,800,504 | 1/1989 | Durst, Jr. et al. . | |
| 4,800,505 | 1/1989 | Axelrod et al. . | |
| 4,800,506 | 1/1989 | Axelrod et al. | 364/478 |
| 4,829,443 | 5/1989 | Pintsov et al. | 364/464.03 |
| 4,831,554 | 5/1989 | Storace et al. . | |
| 4,835,544 | 5/1989 | Winterburn | 346/1.1 |
| 4,853,869 | 8/1989 | Durst, Jr. et al. | 364/478 |
| 4,862,386 | 8/1989 | Axelrod et al. | 364/478 X |
| 4,865,139 | 9/1989 | Cohen et al. | 177/4 |
| 4,868,757 | 9/1989 | Gil | 364/464.03 |
| 4,875,174 | 10/1989 | Olodort et al. | 364/519 |
| 4,910,686 | 3/1990 | Chang et al. | 364/519 |
| 5,027,195 | 6/1991 | Colley et al. . | |
| 5,031,223 | 7/1991 | Rosenbaum et al. | 364/478 X |
| 5,059,960 | 10/1991 | Rosenberg et al. . | |
| 5,122,967 | 6/1992 | Gilham . | |
| 5,133,024 | 7/1992 | Froessl | 382/48 X |
| 5,139,250 | 8/1992 | Zoltner . | |
| 5,143,362 | 9/1992 | Doane et al. | 270/1.1 |
| 5,173,862 | 12/1992 | Fedirchuk et al. . | |
| 5,178,224 | 1/1993 | DiGiulio et al. | 364/464.02 X |
| 5,278,947 | 1/1994 | Balga, Jr. et al. | 395/117 |

MAIL PREPARATION COPIER WITH MAILING ADDRESS IDENTIFICATION

This is a continuation of application Ser. No. 07/961,772, filed Oct. 16, 1992 now abandoned.

Current digital copiers, i.e., copiers that scan an image with photosensitive devices to derive an electronic representation thereof, are very useful in their provision of standard copier functionalities. They commonly afford additional ad hoc functionality in their offerings for editing document contents. Lacking, heretofore however, is specific ability to perform certain functions in an optimized manner, to reduce the complexity of certain tasks.

In preparing mail for posting, several steps must be performed. A letter is created, commonly with information about its origin and destination, on a typewriter or word processor or computer with a word processing application and printed. A copy of the letter is made at a copier for long term, hard copy retention. An envelope must be prepared specifying origin and destination addresses, at a typewriter or printer adapted to printing envelopes. Postage must be applied to the envelope at a postage meter based on the weight of the letter. The postage must be accounted for at the meter. Certain Postal Service functions, such as the application of a phosphorescent ink, bar-coded version of the postal or zip code might be applied. It would seem desirable to combine several of these steps at a single device.

Prior art mail preparation systems including U.S. Pat. No. 4,800,505 to Axelrod et al. and U.S. Pat. No. 4,800,506 to Axelrod et al., show mail preparation systems, including a scanning portion for deriving OCR information about a piece of mail. U.S. Pat. No. 4,797,830 to Baggarly et al., U.S. Pat. No. 4,829,443 to Pintsov et al. and U.S. Pat. No. 4,760,534 to Fougere respectively, show automated postage metering and postage accounting systems.

SUMMARY OF THE INVENTION

In accordance with the invention, the functions of letter copying, envelope addressing, postage application, as well as other possible functions, may be combined into a single digital copier adapted to such functions.

In accordance with the invention, a digital copier with mail preparation functions includes: a document input scanner deriving an electronic representation of an original document placed at a scanning position associated therewith; a document editor, responsive to operator command from a user interface to identify in an original document an area thereof including an address; a document creator, for combining the image from the identified area with a pre-stored envelope image; a source of sheets and envelopes; means for selectively feeding sheets and envelopes from the source to a printer; and means for controlling the printer to create an image on the selected sheet or envelope in accordance with the created envelope image.

In accordance with another aspect of the invention, a digital copier with mail room applications as described above may additionally include; postage amount generation means, responsive to received information about the weight of a document to generate a postage amount; a character generator, responsive to the postage amount generation means, to create data representing an image of the postage amount; the document creator combining the image data from the character generator with the envelope image, to generate an envelope image with a postage amount.

In accordance with yet another aspect of the invention, a digital copier with mail room applications as described above may additionally include postage accounting means, responsive to the postage amount generation means, for deducting from a previously determined postage sum an amount printed on the envelope, to maintain a running total of the postage sum.

In accordance with yet another aspect of the invention, a digital copier with mail room applications as described above may additionally include digital image transmission means, for transmitting via a telecommunications facility, a facsimile image of the original document.

These and other objects and advantages of the present invention will become apparent from the following description taken together with the drawings in which.

DESCRIPTION OF THE PREFERRED EMBODIMENT

Figure 1:
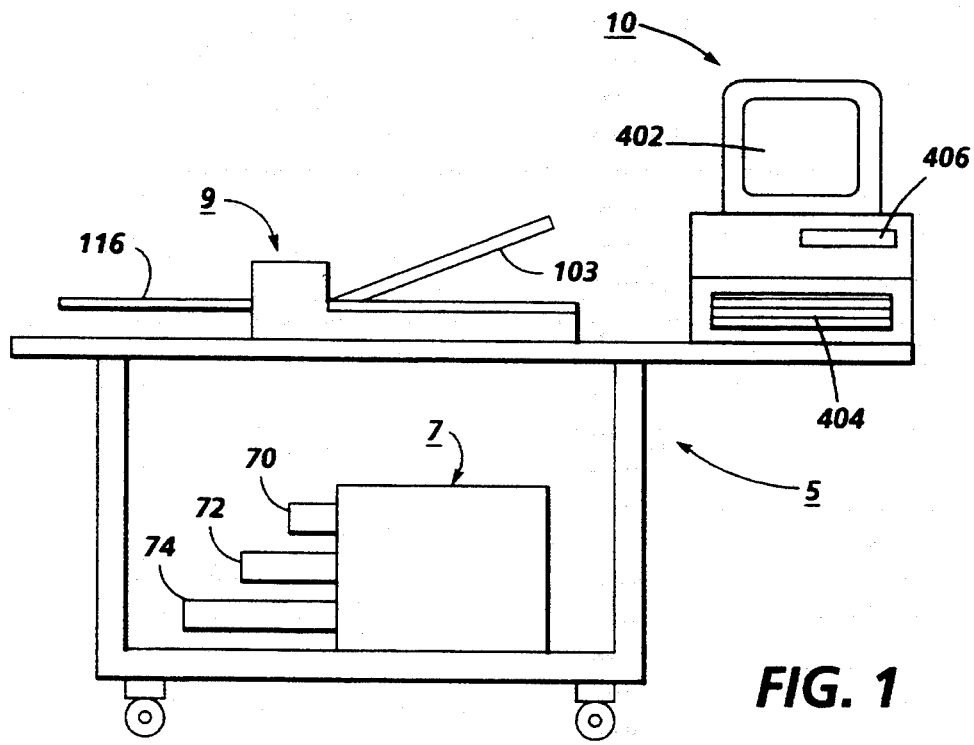
FIG. 1 is a view showing the principal components of a multi-function copier, printer, and facsimile machine of the type adapted to utilize the mail room applications of the present invention.

Referring now to FIGS. 1–4, there is shown by way of example, a multi-function copier, printer, and facsimile machine, designated generally by the numeral 5, of the type adapted to incorporate the mail preparation system of the present invention. It will, however, be understood that the mail preparation system described herein may be used with other electrostatographic or ink jet printer types and machines. Machine 5 has a laser printer 7 and document scanner 9 together with touch panel type User Interface (UI) 10 for controlling and programming machine operation, as will be more completely described with respect to the invention. A hard disk 11 provides memory for storing machine control and image data, the latter being in the form of video image signals. The machine control system includes a host CPU 12, a scan/print Printed Wiring Board (PWB) 13, page buffers 14, and Reduction/Enlargement (R/E) processor 15. A data channel 17, which provides a transmission path for control data and video image signals, is coupled to scan/print PWB 13 and page buffers 14 and UI 10. A multi-port I/O section 18 couples data channel 17 to other external system data sources as well as disk 11. A fax PWB 19, which couples data channel 17 with suitable communications links such as telephone line 25, enables facsimile transmission and reception. Machine 5 may be connected to serve as a printer when connection is established with a single workstation, multiple workstations, or a local area network. Server 625 is also connected to both telephone line 25, for postal accounting communications, and to data channel 17, to direct image data to the Scan print boards for printing.

Printer 7 includes a photoreceptor drum 20, the outer surface 22 of which is coated with a suitable photoconductive material, and a charge corotron 28 for charging the drum photoconductive surface 22 in preparation for imaging. Drum 20 is suitably journaled for rotation within the machine frame (not shown), drum 20 rotating in the direction indicated by the arrows to bring the photoconductive surface thereof past exposure, developer, and transfer stations 32, 34, 36 of printer 7.

In the xerographic process practiced, a photoconductive surface 22 of drum 20 is initially uniformly charged by charge corotron 28, following which the charged photoconductive surface 22 is exposed by imaging beam 40 at exposure station 32 to create an electrostatic latent image on the photoconductive surface 22 of drum 20.

Figure 9:
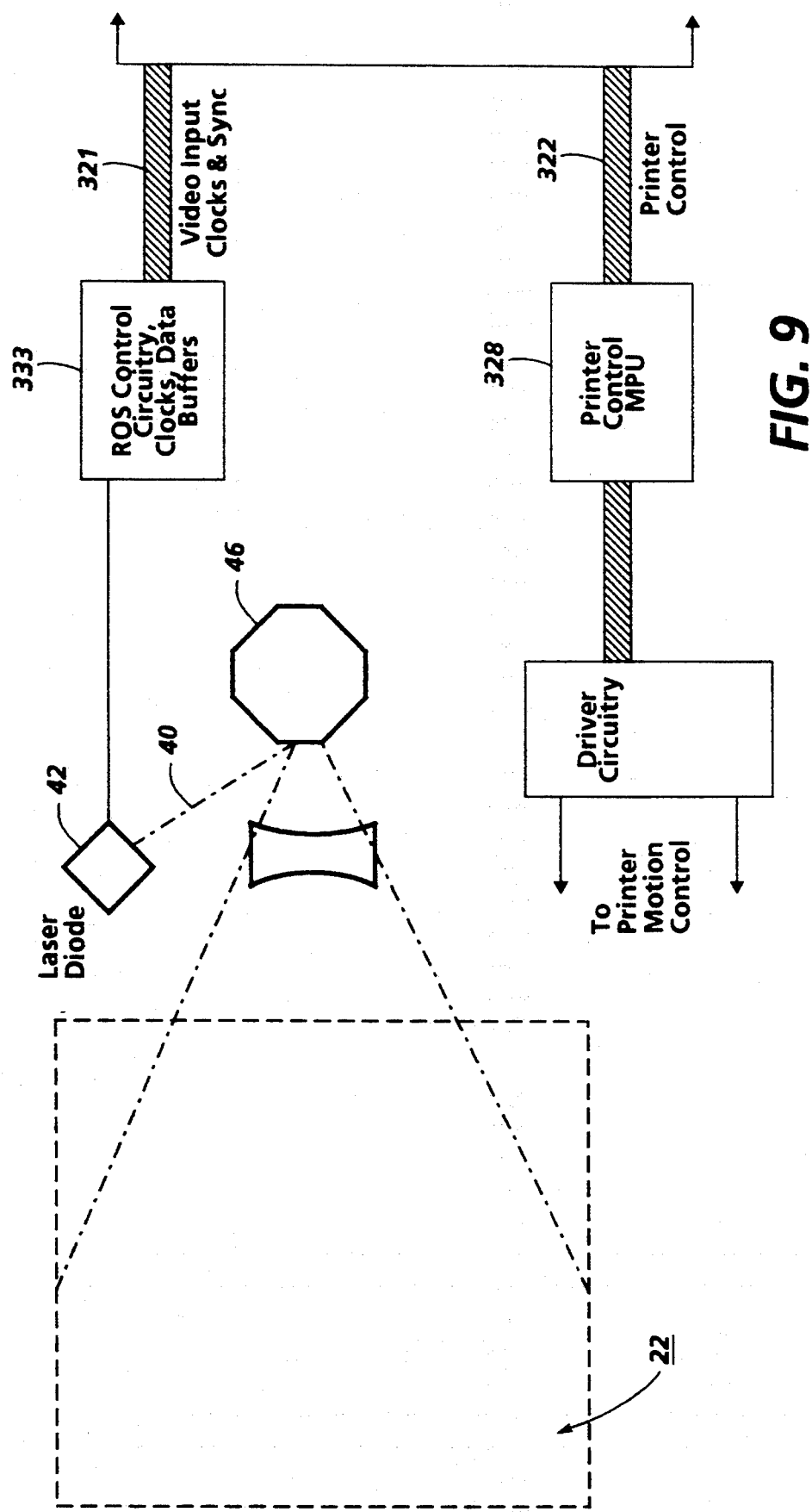
FIG. 9 is a block diagram showing details of the scan control circuitry for operating the printer.

Referring also to FIG. 9, imaging beam 40 is derived from a laser diode 42 modulated in accordance with video image signals from scan/print PWB 13. Image signals may be provided by scanner 9, disk 11, or from a suitable external source through multi-port I/O section 18, fax PWB 19, or any other suitable interconnection. The modulated imaging beam 40 output by laser diode 42 is impinged on the facets of a rotating multifaceted polygon 46 which sweeps the beam across the photoconductive surface 22 of drum 20 at exposure station 32. Other exposure systems including LED bar arrangements are well known and substitutable.

Following exposure, the electrostatic latent image on the photoconductive surface 22 of drum 20 is developed at developer station 34 by a single component magnetic brush development system that includes a rotatable magnetic brush roll 50 in developing relation with the surface 22 of drum 20. Single component developer is supplied to magnetic brush roll 50 from a developer housing 52. Two component developer systems are well known and substitutable.

Prints or copies are produced on a suitable support material, such as copy sheets 68 and envelopes 68a. A supply of support material is provided by trays 70, 72, 74, each tray having a feed roll 76 feeding one sheet or envelope at a time from the stack of sheets or envelope in the tray to a pinch roll pair 78 where the sheet or envelope is registered with the image developed on drum 20. Following registration, the sheet or envelope is forwarded to transfer station 36 where the developed image is transferred from photoconductive surface 22 to the sheet or envelope. Following transfer, the sheet or envelope bearing the toner image is separated from photoconductive surface 22 of drum 20 and advanced to fixing station 80 wherein roll fuser 82 fuses or fixes the transferred powder image thereto. After fusing, the finished material is advanced by print discharge rolls 84 to print output tray 86. There are many equivalent sheet feeders and envelope feeders which will work equally as well for this application. One possible envelope feeder is described in U.S. Pat. No. 5,139,250 to Zoltner. In certain printers, form feeding devices with envelopes tacked with adhesive or burstable stock may also be suitable.

Any residual toner particles remaining on the photoconductive surface 22 of drum 20 after transfer is removed by a suitable cleaning mechanism (not shown).

An in-line fluorescent ink printer may be provided at a convenient location along the paper path, in this case post-fuser for the purpose of providing franking or postmark affixation, in accordance with a stored postmark image combined with appropriate postage amount. In one embodiment, the in-line printer may be a small, ink jet printer array, such as that shown by U.S. patent application Ser. No. 07/877,502 to Taylor et al., filed May 1, 1992, with fluorescent ink meeting the legal requirements of the United States Postal Service. Of course, if the Postal Service should relax these requirements, other inks might be used. One known ink jet process prints directly on paper, and provides a reservoir of ink from which ink is fed to a series of printing orifices, past a resistive heating element. Upon directing a control signal to any one of the resistive heating elements based on the bitmap of the image, an expanding bubble of vaporized ink drives ink from the orifice towards the paper.

Alternative methods of printing a second color allowable for use by the Postal Service are available, including electrophotographic marking methods including a two pass, changing developer housing type machine, a single pass highlight color machine using either a tri-level process or an expose/develop/recharge/expose/-develop process, with a substantially scavengless development system. Other electrophotographic methods of forming a second image exist.

In another embodiment, the printer itself may consist of an ink jet printer, where the required fluorescent ink is used for printing the entire envelope image. While this arrangement is undoubtedly more expensive, and may result in less than desirable colored ink printing on the printer, it is nonetheless a possible, simplistic embodiment of the invention.

Figure 4:
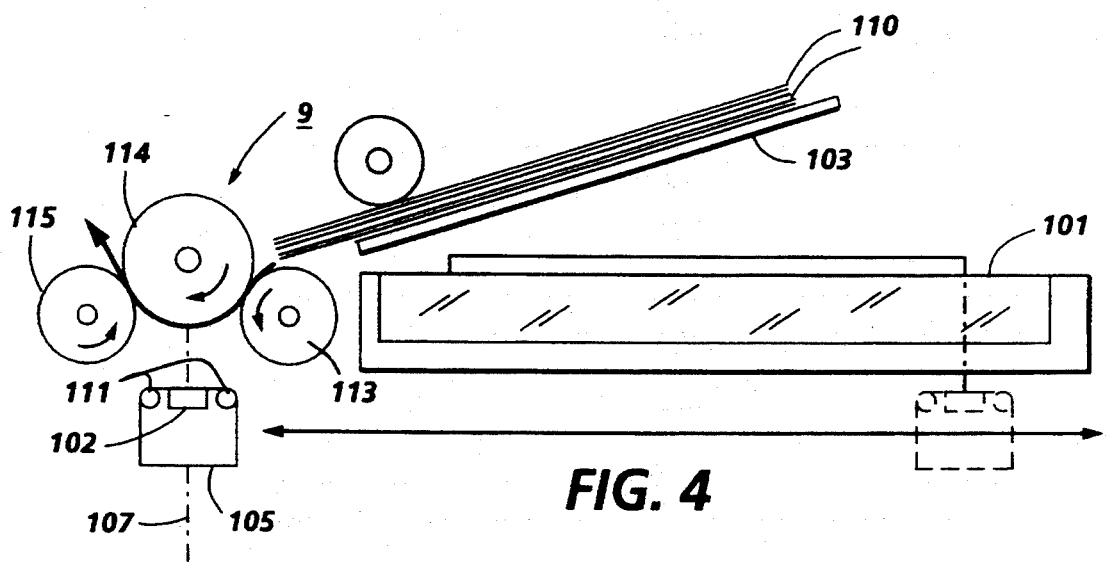
FIG. 4 is a more detailed view of the document input scanner for the machine shown in FIG. 1.
Figure 2:
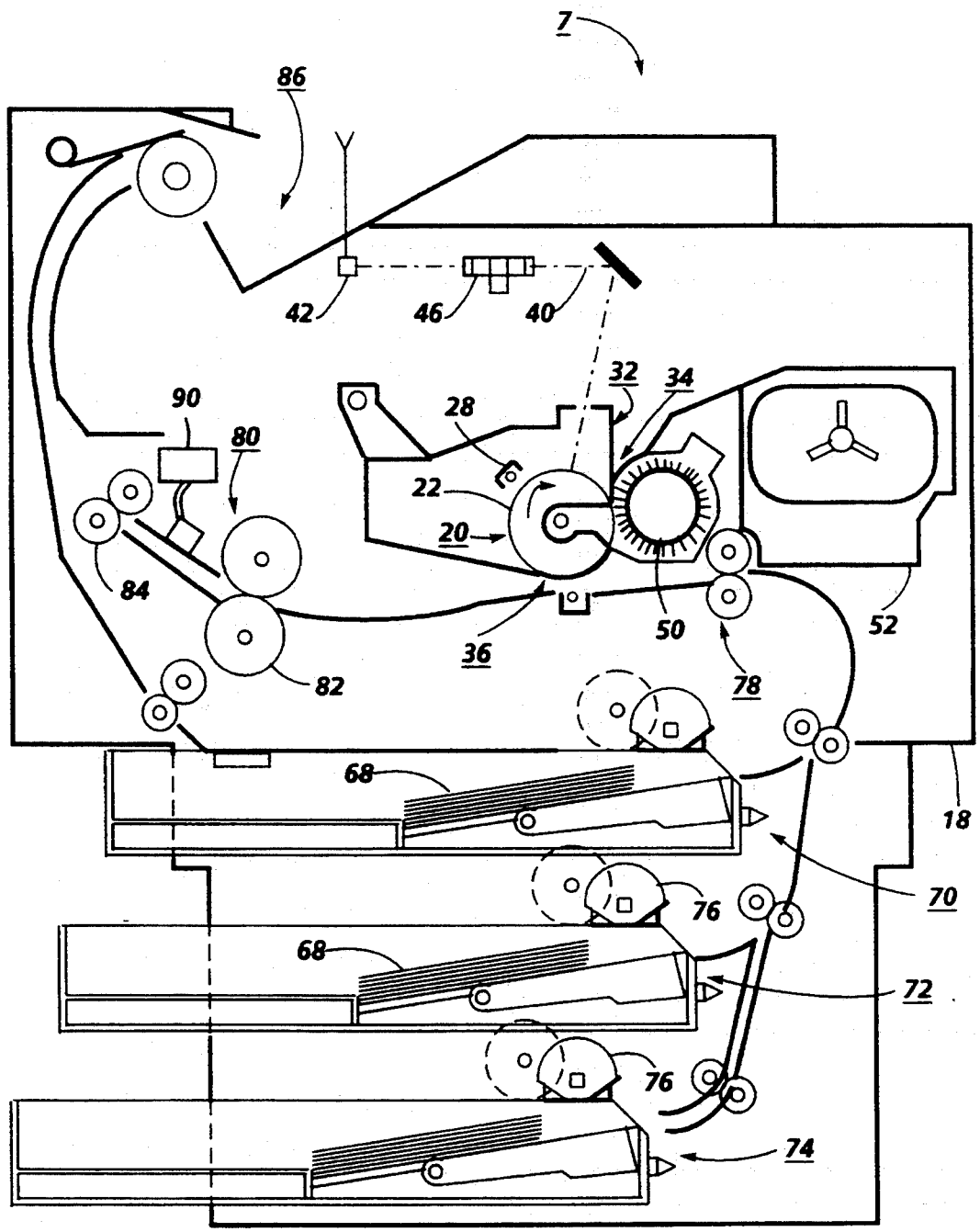
FIG. 2 is a view in cross section showing details of the laser printer for the machine shown in FIG. 1.
Figure 3:
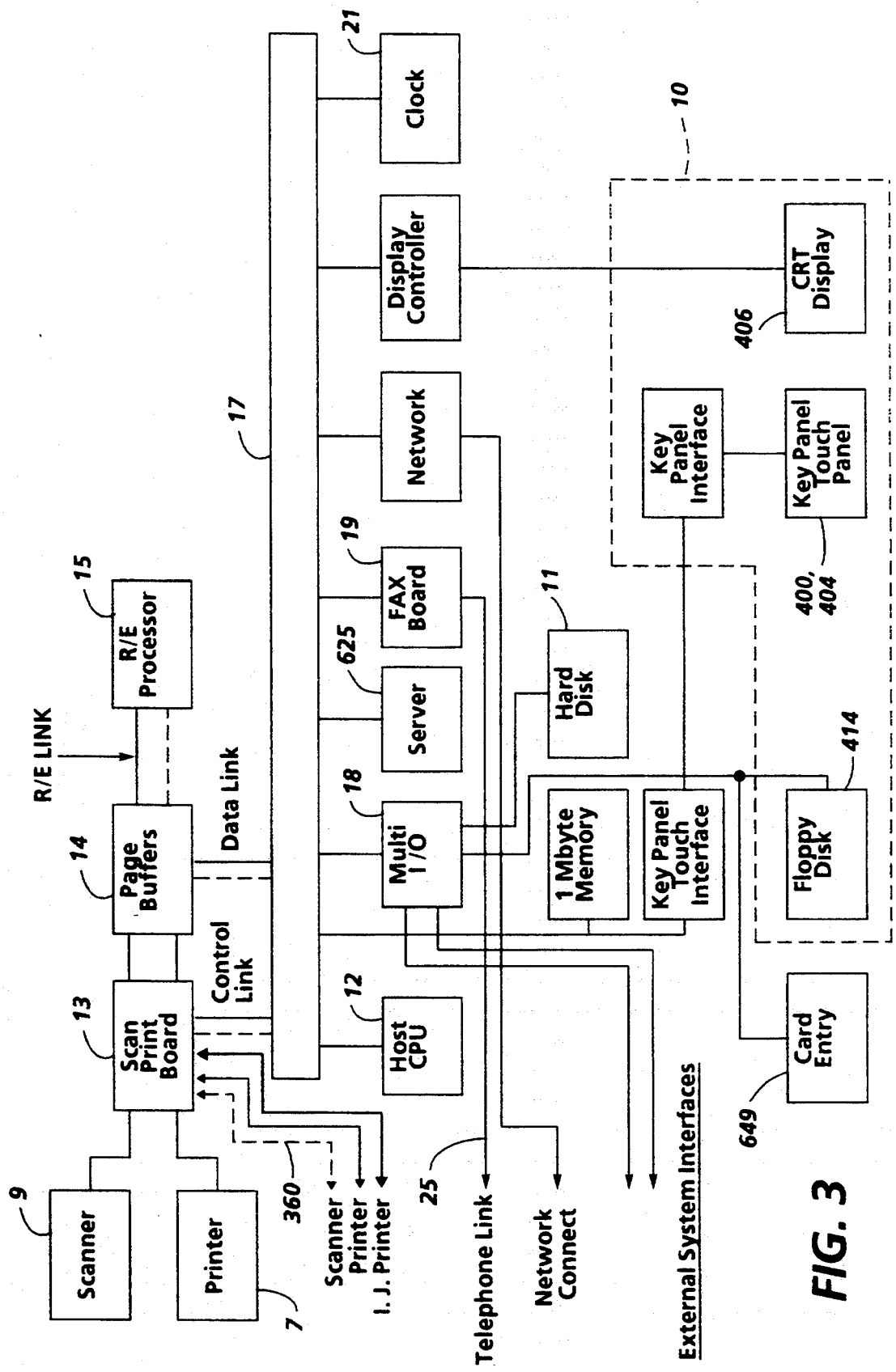
FIG. 3 is a block diagram showing the principal operating circuits for the machine shown in FIG. 1.

With reference now to FIG. 4, document scanner 9 is a dual mode scanner, permitting either manual scanning operation in which a document 110 to be scanned is manually placed upon a transparent platen 101, or automatic scanning in which one or more documents to be scanned are placed on inclined document feed tray 103. Scanner 9 has a CCD type contact array 102 disposed on a movable scan carriage 105. Carriage 105 is suitably supported for reciprocating back and forth scanning movement below platen 101, carriage 105 moving from a home or park position 107 adjacent one end of platen 101 to the opposite end and back. Lamps 111 on carriage 105 illuminate the document line being scanned. A hinged cover is provided to close platen 101 during manual scanning and to cover and protect the platen when not in use.

For automatic scanning operating, scan carriage 105 is retained in the park position 107 and the document(s) to be scanned, which rest on inclined document feed tray 103, are transported one by one past array 102 by means of document feed rolls 113, 114, 115. Feed rolls 113, 114, 115 cooperate to form nips upstream and downstream of the scan point. The scanned document(s) are deposited onto a discharge tray 116 (seen in FIG. 1) for removal.

Figure 5:
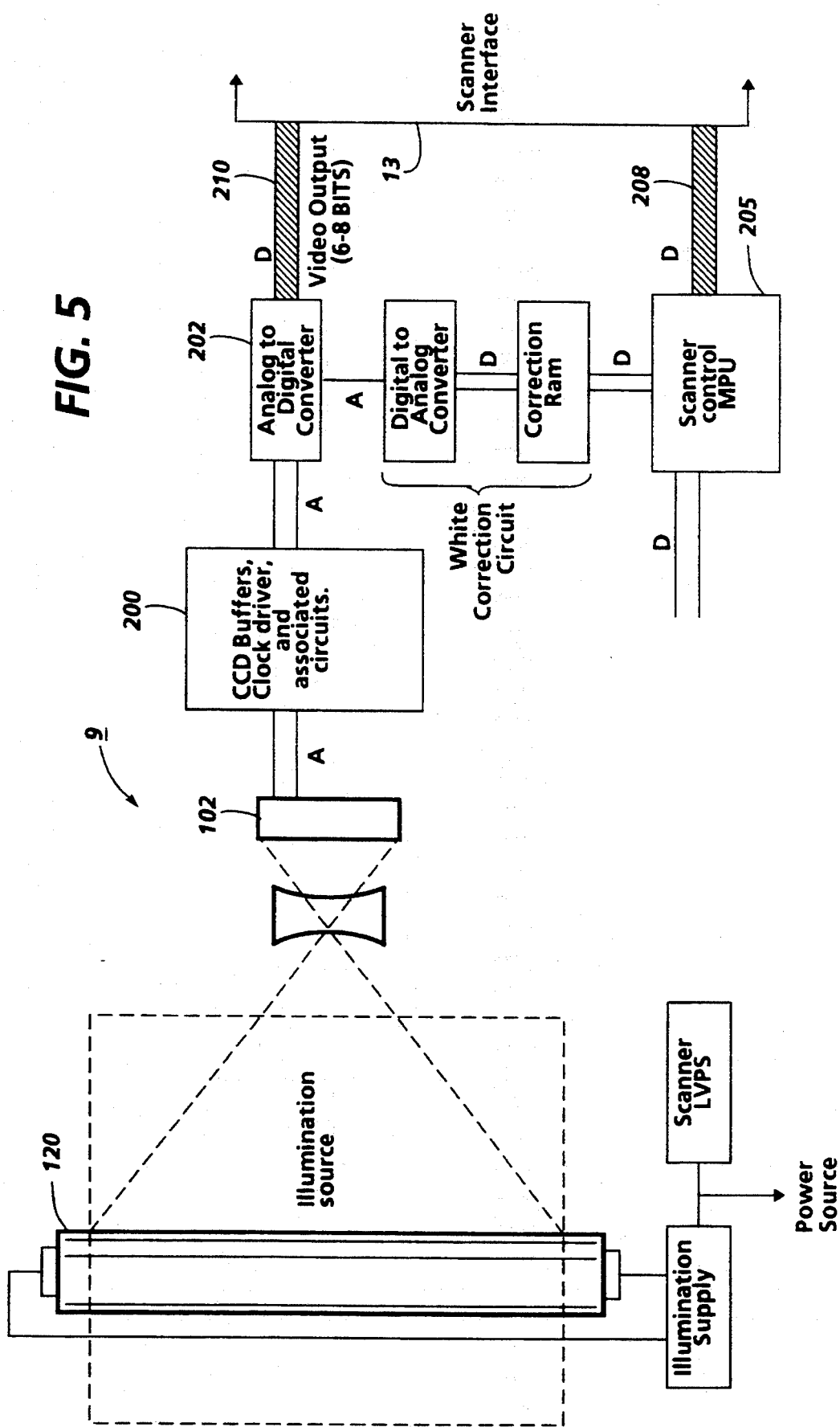
FIG. 5 is a block diagram showing details of the scan control circuitry for the document input scanner.

Referring to FIG. 5, signals output by array 102 of scanner 9 are buffered by buffer 200, while the signals are processed following which the signals are converted to digital by A/D converter 202. Local control of scanner 9 is provided by a controller 205. Scanner 9 is interfaced with scan/print PWB 13 by communications port 208 and video output port 210, the latter carrying pixel clock, line sync, and page sync signals in addition to the video image data.

Figure 6:
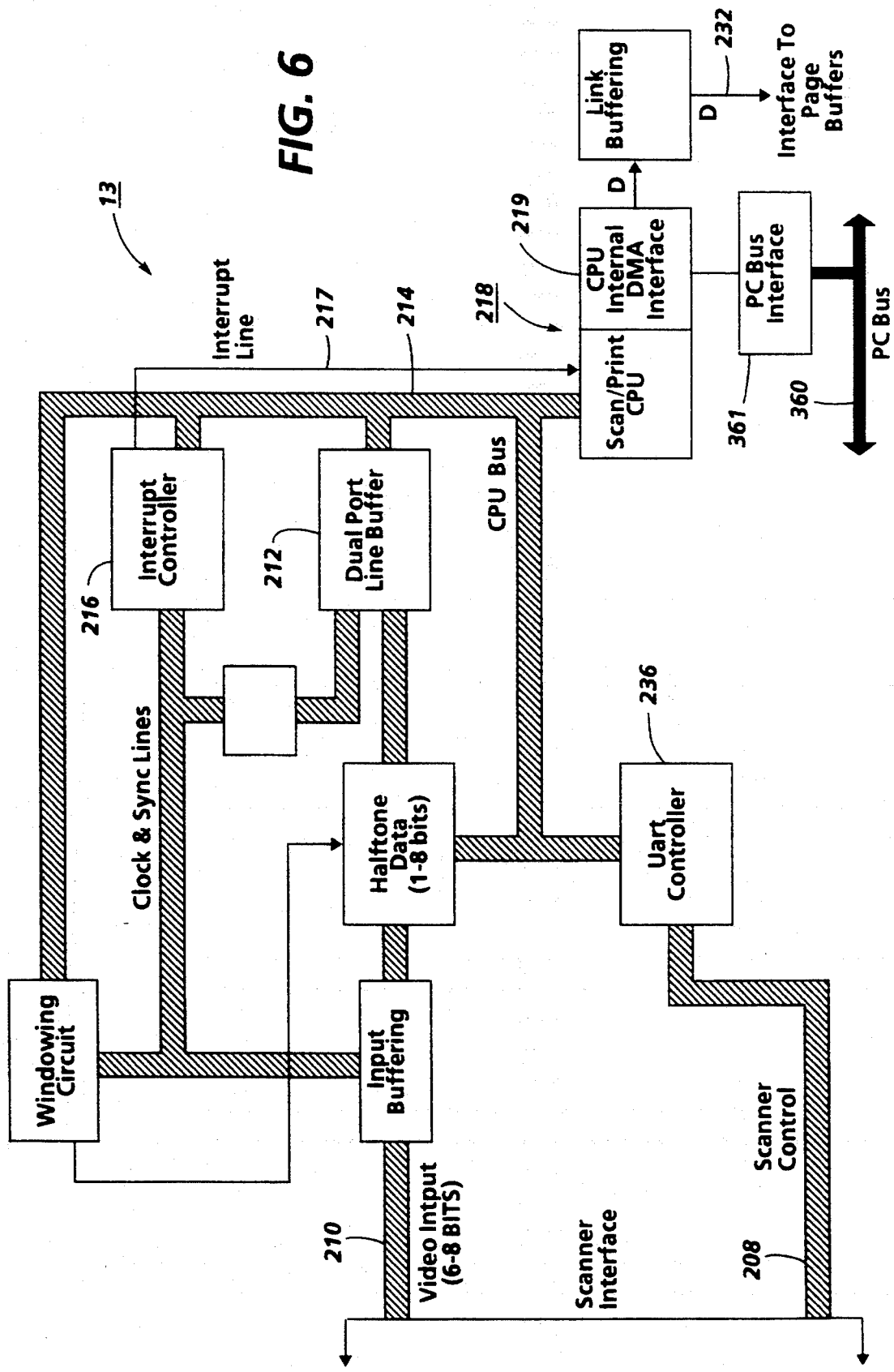
FIG. 6 is a block diagram of the circuitry for processing image signals output by the document input scanner.
Figure 7:
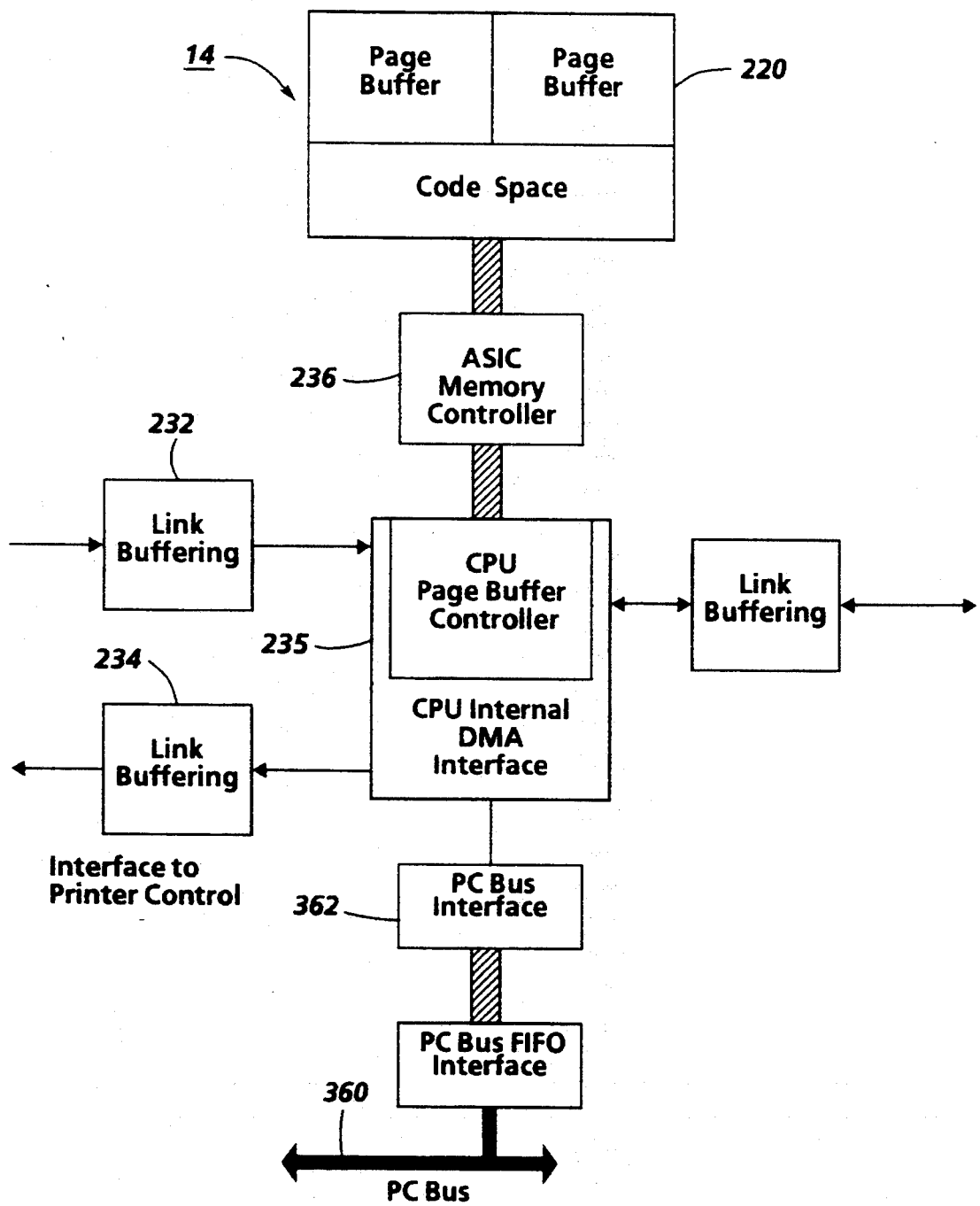
FIG. 7 is a block diagram of the page buffer circuitry for storing image signals.

Referring to FIGS. 6 and 7, the video image signals output by scanner 9 are stored in sequential order in one side of dual port line buffer 212 of scan/print PWB 13. A processor bus 214 is tied to the other side of buffer 212. As each image line from scanner 9 is completed, an interrupt controller 216 responds and outputs an interrupt signal via line 217 to the internal DMA interface 219 of a transputer 218 causing transputer 218 to read an image line out of buffer 212.

The image line is sent to a buffer 220 of page buffers 14 by a 'link' protocol built into transputer 218. The link protocol allows for automatic asynchronous transfers of large amounts of video data with no processor overhead. By using separate links 232, 234 under the control of page buffer controller 235, one for transferring image data from scanner 9 to page buffers 14, and the other for transferring image data from page buffers 14 through transputer 236 (seen in FIG. 8) to printer 7, very high image data transfer rates are achieved, allowing both printer 7 and scanner 9 to operate at the same time. Further, the asynchronous nature of links 232,234 allows printer 7 and scanner 9 to run at different speeds and image sizes.

Figure 8:
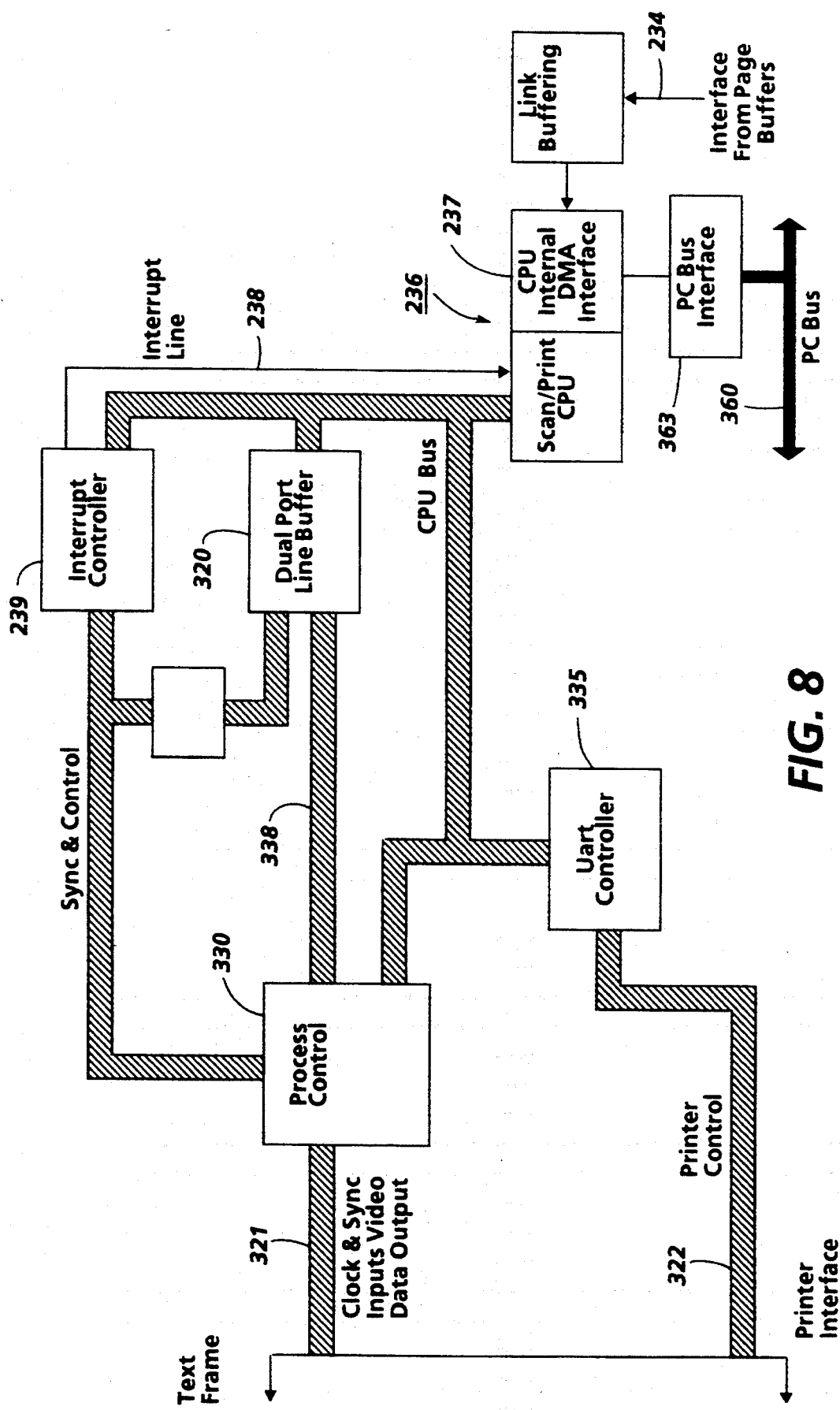
FIG. 8 is a block diagram of the circuitry for processing image signals for printing by the printer.

Referring to FIGS. 7-9, image data is output to printer 7 from page buffers 14 over link 234 in substantially the same manner as image data is received from scanner 9. On a request for a page, printer 7 cycles up and provides pixel clock, line sync, and page sync signals. During each line sync signal, transputer 236 programs internal DMA interface 237 in response to an interrupt signal from interrupt controller 239 through interrupt line 238 to read out a specific number of image signal bytes from page buffers 14 into one side of dual port line buffer 320. From buffer 320, the image signals are input to the process control 330 of the present invention where the image gray level is adjusted.

The processed video image signals output by control 330 together with pixel clock, line sync, and page sync signals are transmitted to printer 7 through video output port 321 and control circuit 333 to diode 42. Control information for printer 7 is transmitted to the printer control 328 from controller 335 via a communications port 322. Printer control 328 controls all paper handling, xerographic, and video control functions of printer 7. In addition, diagnostics and component control functions can be accessed. Once a page is requested, printer 7 cycles up and provides pixel clock, line sync, and page sync as outputs for synchronizing the video image signals sent to laser 42 for imaging onto drum 20.

As seen in FIGS. 6-8, transputers 218, 236 and page buffer 220 may be interfaced with an external data source or printer such as a Personal Computer (PC) through a bus 360 and bus interfaces 361, 362, 363. Interrupt controllers 216, 239 of scan print PWB 13 allow transputers 218, 236 to respond to real time event requests (line sync, scan sync, page sync, communications, etc.) from the outside source. Each interrupt is maskable in hardware to lock out either the scanner or printer interrupts.

Figure 10:
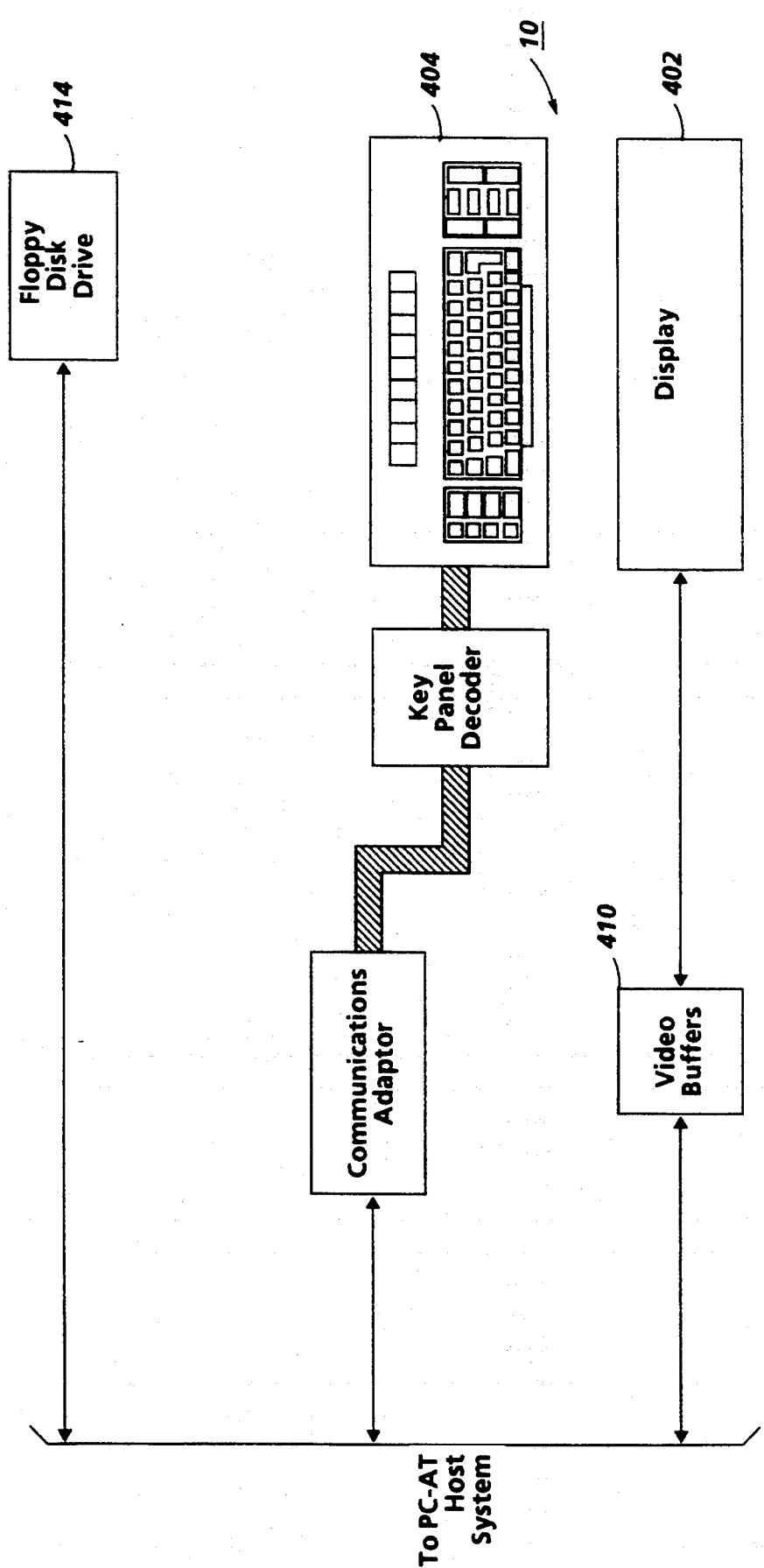
FIG. 10 is a block diagram showing the principal components of the User Interface for the machine shown in FIG. 1.

Referring to FIG. 10, Ul 10 includes a CRT display 400. Display 400 displays operator selections and machine operating data in the form of icons or pictograms and alpha numeric characters. These provide various operator selections for programming the machine 5 and informational messages and instructions such as identifying machine faults, providing diagnostic instructions, etc. Optionally, the scanned image is displayed as well at CRT display 402. Additionally, a keyboard 404 is provided for the entry of operator instructions. Additional control and informational displays and/or other display types may be contemplated. In conjunction with a measuring surface surrounding the platen, positional information may be entered at the Ul 10 describing the position of the destination address and/or the origination address, for the formation of the envelope image. Alternatively, if the image is displayed at CRT display 402, a mouse type cursor control, and well known associated mouse drive software, may be used to select the position of the destination address and/or the origination address, for the entry of positional information for the formation of the envelope image.

In yet another method of area designation, on a copy of the letter made for the purpose of address designation, the address may be circled with a pen writing in ink to which the scanner is sensitive, beyond the mere detection of the ink as the color of the printed image. Such a sensing arrangement is known, as taught in U.S. Pat. No. 5,027,195 to Cooley, which teaches color detection and/or recognition apparatus. Implied in that reference is that multiple colors of markers, and therefore multiple circled areas, may be recognized. As taught in U.S. Pat. No. 4,777,510 to Russel, detection of such marking is useful for enabling editing programming in copying machines, and presumably digital copying machines. As taught by U.S. Pat. No. 4,471,386 to Tuhro, retro-reflective markings surrounding or partially surrounding a selected area may also be detected as defining an area, based on their unique optical response.

To enable software programs to be written to or read from hard disk 11 through the mechanism of floppy disks, a suitable floppy disk drive 414 with suitable R/W head is provided. By using floppy disks, users can input print jobs directly rather than by a network. Additionally, system software updates, fonts, and custom drivers etc., may also be loaded by the floppy disks.

In accordance with the invention, a digital copier may be used in processing mail. With initial reference to FIG. 5, upon selection of the mail preparation feature and scanning of the original letter or correspondence, signals output by array 102 of scanner 9 are buffered by buffer 200, while the signals are processed following which the signals are converted to digital by A/D converter 202. Scanner 9 is interfaced with scan/print PWB 13 by communications port 208 and video output port 210, the latter carrying pixel clock, line sync, and page sync signals in addition to the video image data. With reference now to FIG. 6, video image signals output by scanner 9 are stored in sequential order in one side of dual port line buffer 212 of scan/print PWB 13. A processor bus 214 is tied to the other side of buffer 212. As each image line from scanner 9 is completed, an interrupt controller 216 responds and outputs an interrupt signal via line 217 to the internal DMA interface 219 of a transputer 218 causing transputer 218 to read an image line out of buffer 212 to page buffer 14. With reference to page 7, from page buffer 14, the image video data is copied through the page buffer controller and CPU Internal DMA interface 235 to the PC bus interface 362 and onto the PC bus 360, where it can be stored video buffer 410 (shown in FIG. 10), for display at display 406.

Once displayed, the address area of the letter image is identified by an operator via keyboard 404. This identification is directed back via the PC bus interface 362 to page buffer controller and CPU Internal DMA interface 235, which reads the identified portion or portions of the image out of the page buffer 14 via link buffer 234 to the printer. Image data is output to printer 7 from page buffers 14 over link 234. On a request for an envelope, printer 7 cycles up and provides pixel clock, line sync, and page sync (which now has a period reflecting an envelope size) signals. During each line sync signal, transputer 236 programs internal DMA interface 237 in response to an interrupt signal from interrupt controller 239 through interrupt line 238 to read out a specific number of image signal bytes from page buffers 14 into one side of dual port line buffer 320. The processed video image signals output by control 330 together with pixel clock, line sync, and page sync signals are transmitted to printer 7 through video output port 321 and control circuit 333 to diode 42. Control information for printer 7 is transmitted to the printer control 328 from controller 335 via a communications port 322. Printer control 328 controls all paper handling, xerographic, and video control functions of printer 7. In addition, diagnostics and component control functions can be accessed. Once an envelope is requested, printer 7 cycles up and provides pixel clock, line sync, and page sync as outputs for synchronizing the video image signals sent to laser 42 for imaging onto drum 20.

Subsequent to imaging on drum 20, the toner image thereon is transferred to an envelope selectably fed from the envelope tray in response to the mail preparation command. Subsequent to fusing at fuser 80, the envelope passes in-line ink jet printer 90, printing with ink acceptable for Postal Service standards. Ink jet printer 90 prints an image combining first a prestored postage mark, which is often desirably customized for a particular image, and a set of numerical characters representing date and postage amount. These values are generated at server 625.

Figure 11:
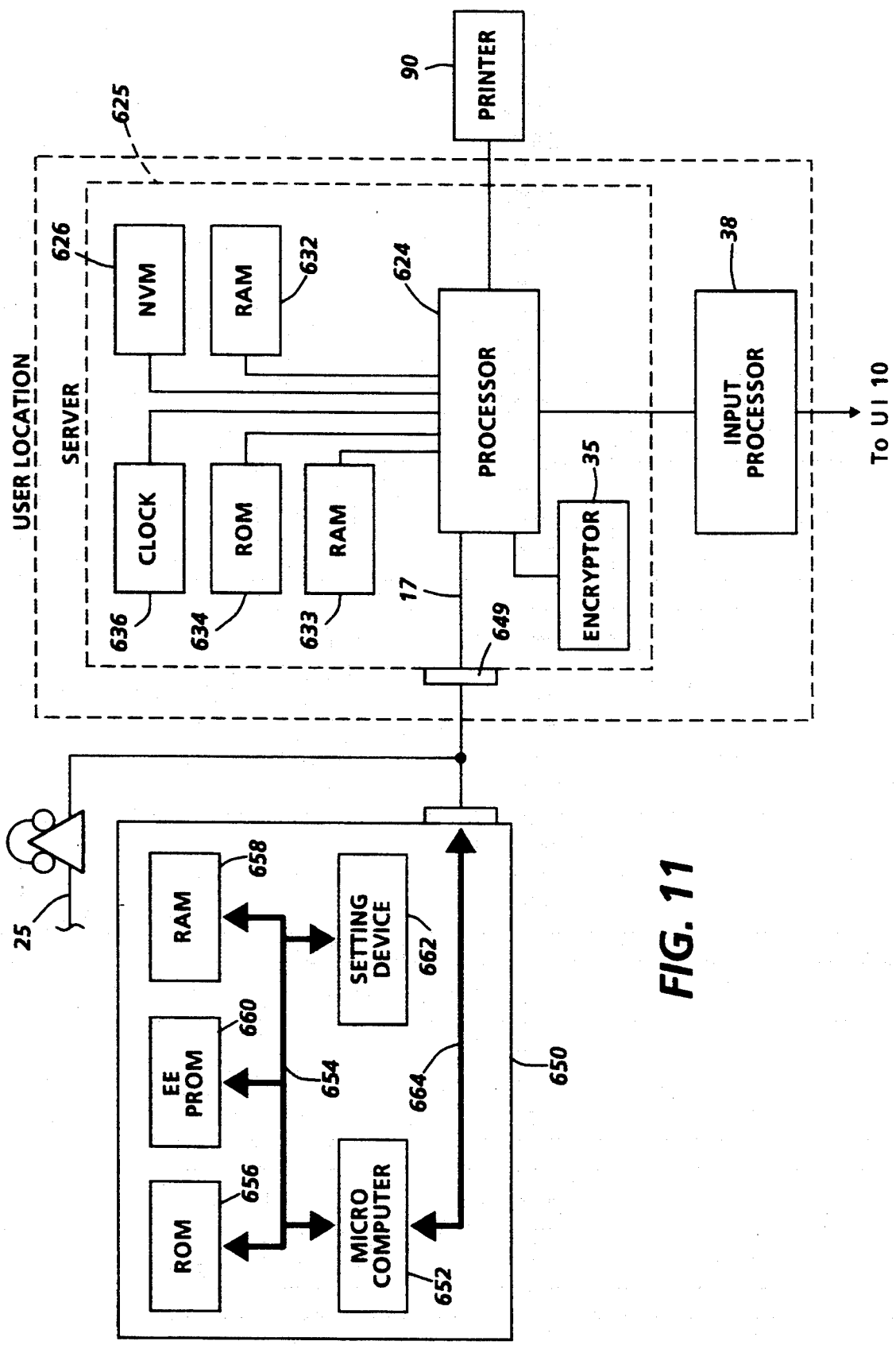
FIG. 11 is a schematic diagram showing details of the postmark creation, postage generation and accounting system.

U.S. Pat. No. 4,797,830 to Baggarly et al., incorporated herein by reference, teaches a possible postage printing and accounting system. With reference now to FIG. 11, secure unit 625 will hereinafter be referred to as a "server". Server 625 is provided with user processor 624 such as an Intel 8085 processor available from Intel Corporation, Santa Clara, Calif. Connected to the processor 624 is memory 626. Preferably memory 626 will be a non-volatile memory (NVM). Also connected to the processor 624 are RAM 632, postmark ROM 634, encryptor 635 and clock 636. ROM 634 contains information that formats signals and stores a series of programs for controlling the functions of the server 625, a RAM 632 that will hold and supply real time data, postmark RAM 633 stores a bitmap representation of the postmark, stored there from scanner 10, or created with image manipulation software at UI 10 or that portion of the postal impression or image that is constant, clock 636 that will provide the time and date images, and an encryptor 635 that will store the code required for the descending register setting functions. Encryptor 635 can be any one of a number of encrypting devices including devices which use the Data Encryption Standards described in FIPS P4B 46, dated Jan. 15, 1977, and published by the U.S. Department of Commerce, National Bureau of Standards. An input processor 638 is connected to the user processor 624 whereby data may be supplied to the user processor 624 for the purpose of providing data required in processing mail pieces.

Server 625 has many characteristics of a postage meter as well as differences that will be discussed hereinafter. Postage meters are mass produced devices for printing a defined unit value for governmental or private carrier delivery of parcels and envelopes. The term postage meter also includes other like devices which provide unit value printing such as tax stamp meters. Postage meters include internal accounting devices that account for postage value representation stored within the meter. The accounting device accounts for both the recharging of the meter with additional postage value and the printing of postage by the meter printing mechanism. No external independent accounting system is available for accounting for the postage printed by the meter. Accordingly, postage meters must possess a high reliability to avoid the loss of user or governmental funds stored within the meter and dispensed by printing postage.

In-line ink jet printer 40 is in communication with the user processor 624 of the server 625 and with the input processor 638 and is able to print upon mail pieces such as envelopes passing thereby. In this system, server 625 includes an input port 649 adapted to provide communication with a removable data device 650. The removable data device 650 can be in the format of a "smart credit card" type structure or a larger enclosed type structure such as a cartridge or vault, and the like, which for purposes of this description and accompanying claims, will be referred to collectively as a "card". The card 650 provides physical support for and protection of a microcomputer 52 which is connected by a private bus 54 to a plurality of internal components. The microcomputer 652 is connected via the bus 654 to a read only memory (ROM) 656 which contains the operating program for the microcomputer 652. The program resident in the ROM 656 not only controls the operation of the microcomputer 652, but also provides operating instructions by which the microcomputer 652 communicates with the server 265. Alternatively, the microcomputer can be internal or integral with the server, and the "card" may be a simple magnetic storage device, holding encoded user information.

Microcomputer 652 is also connected via the bus 654 to a random access memory (RAM) 658, or other operating memory, to provide dynamic data storage during operation. A nonvolatile memory (NVM) 660 such as an electrically erasable program read only memory (EEPROM) provides nonvolatile storage for critical accounting data. Critical accounting data often includes the descending register value, the ascending register value, the piece count value and the like. Any accounting or other data desired to be retained during power failure, such as during servicing, can also be filed in the nonvolatile memory 660. The nonvolatile memory 660 also may contain the server 625 number, as well as various configuration data so that the server 625 is operable in various countries which have different requirements and in various systems which have different configurations. The microcomputer 625 is connected via the bus 654 to a setting device 662.

In contrast to the private bus 654, which is not accessible by any user or equipment external to the card 650, a public bus 664 is provided to connect the server 625 to the card 650. It should be recognized that other devices peripheral to the server 625 can be connected to the public bus 664 such as additional printers, displays, communications devices and the like. The public bus 664 is a general purpose bus to allow communications between the server 625 and the components within the card 650 and between the card 650 other devices. Thus, card 650 serves as a data carrier from the user location to a central post office or the like, to accommodate billing practices.

It should be recognized that the server 625 is powered by an external source of power, not shown, and during normal operation provides the power to energize the microcomputer 652, as well as the various components of the card 650, including the ROM 656, RAM 658, NVM 660, and setting device 662, which may be connected via the bus 664 to the microcomputer. Power sensing circuitry, not shown, such as is disclosed in U.S. Pate. No. 4,285,050 to Muller, for Electronic Postage Meter Operating Voltage Variation Sensing System, can sense the presence of falling power and cause the microcomputer 652 to invoke a power down subroutine stored in the ROM 656 to complete operations in progress and store accounting data into NVM (nonvolatile memory) 660.

Postage value may be supplied to the NVM 660 of the card through communication with an authorized source. This communication may be through the server 625 via telephone link 25. Under command of the microprocessor 652, information may be provided by the user through the input/processor 638 of the server 625. With public bus 664 inserted into port 649, all functions to server 625 would be disabled under command of input/processor 638 during resetting of the postage value in NVM 660. The amount of postage value to be credited to NVM 660 of card 650 would be accomplished in the remote resetting scheme to which previous reference was made. With such refreshing of the NVM 660, postage value may be transferred to other copiers as required. This is accomplished by providing communication between the server 625 and the microcomputer 652 through commands of the input/processor 638. This information would include the server number, the amount to be credited to the NVM 626 and the server 625, the time as given by the clock 636, and the like. Upon transfer of funds, a selected amount of postage value residing in the NVM 626 of the server 625 is transferred from the NVM 660 of the card 650 so that the ascending and descending registers to the NVM 660 may be refreshed. Obviously, a number of servers 625 may have postage value credited thereto by a card 650. This provides the advantage that the user may have postage value credited but once by communicating with the post office and subsequently upgrade the postage value in a number of servers 625.

It might be expected that postage values can be entered in several ways. The operator, having knowledge about the cost of the postage from other sources, might directly enter it in response to a UI displayed query upon selection of "mail preparation". Alternatively, a calculation might be accomplished by the machine, knowing the number of sheets of a certain weight, in combination with the envelope, which together from the mail piece. Finally, an in-line scale, might be used to weigh each item that is copied, in addition to the envelope prepared, for deriving a postage sum.

In summary, a digital copier having a scanner and printer is provided with a mail preparation function including means for scanning an original document bearing an address, means for identifying the address portion, means for forming a new, envelope image using the address portion, to create an image for printing on an envelope at the printer, a source of sheets and envelopes; means for selectively feeding sheets and envelopes from the source to a printer to receive the image. In combination with the address image creation functionality, the digital copier may also be provided with postmark generating means, which generate a postmark image representing a postmark in combination with a postage amount, for printing. In combination with the envelope printing apparatus, means are provided to account for postage used.

It will no doubt be recognized that the mail preparation function might also be a selectable option feature of the facsimile function herein described. Accordingly, if "mail preparation" is selected in conjunction with selection of facsimile transmission, for hard copy confirmation, after scanning the facsimile for transmission, the operator will be offered the opportunity at UI 10 to identify address portions of the image, for preparation of an envelope for mailing the original of the facsimile.

Figure 12:
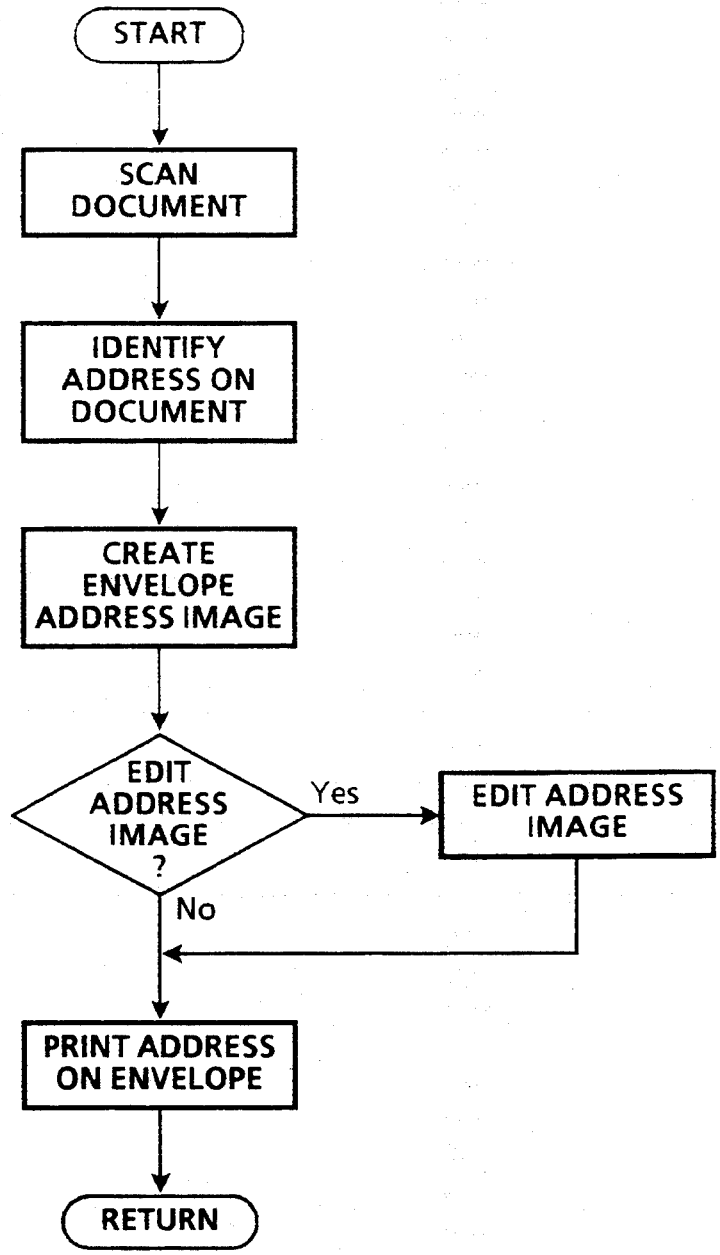
FIG. 12 is a flow chart illustrating a method for using the described apparatus.

FIG. 12 is a flow chart illustrating a method for using the described apparatus.

While the invention has been described with reference to the structure disclosed, it is not confined to the details set forth, but is intended to cover such modifications or changes as may come within the scope of the following claims.

We claim:

1. A digital copier having a mail preparation function comprising:
   a document input scanner deriving an electronic representation of an original letter with destination address contained in the scanned image thereof when the document is placed at a scanning position associated with the input scanner;
   a document editor, responsive to operator command from a user interface, to identify in the scanned image a portion including a destination address;
   a document creator, creating an envelope address image from the destination address image portion in the original letter;
   a source of sheets and envelopes to receive printed images thereon;
   means for selectively feeding envelopes from said source to a printer; and
   means for controlling said printer to create an image on the envelope in accordance with the created envelope image, said image including the destination address from the original letter, processed for envelope placement.

2. The device as defined in claim 1, including postmark generation means for controlling said printer to print a postmark on said envelope from a stored postmark image concurrently with printing said destination address and variable postage information.

3. The device as defined in claim 2, wherein said postmark generation means for printing a postmark on said envelope includes a memory storing a static portion of a postmark image, and a postage value representative of an assembled weight of a mail piece including the envelope received from a postage value source.

4. The device as defined in claim 3, including postage accounting means, including a postage amount memory, means for receiving said postage value, and means for decrementing a current value in said postage amount memory, in accordance with the postage value.

5. The device as defined in claim 1, including
unit value generation means for printing a unit value on said envelope from a stored unit value image.

6. The device as defined in claim 1, including
a second printer for printing postmarks;
postmark generation means for controlling said second postage printer to print a postmark on said envelope from a stored postmark image.

7. A digital copier, including a facsimile transmission circuit selectably connectable to a data transmission line, and a facsimile controller, said digital copier comprising:
a document input scanner deriving an electronic representation of an original letter with destination address image contained in the scanned image thereof, when the document is placed at a scanning position associated with the input scanner;
a user interface for entering facsimile transmission programming information for the facsimile controller, and including a selectable hard copy confirmation programming function;
said facsimile controller, responsive to said facsimile transmission programming information, controlling said facsimile circuit to direct said electronic representation of the original letter to said data transmission line;
a document editor, responsive to selection of the hard copy confirmation programming function during facsimile transmission programming at a user interface, to identify in the scanned image a portion including a destination address image;
a document creator, creating an envelope address image from the destination address image from the scanned image;
a source of envelopes to receive printed images thereon;
means for selectively feeding envelopes from said source to a printer; and
said facsimile controller means for controlling said printer to create an image on the envelope in accordance with the created envelope image, whereby the user can mail a hardcopy confirmation of the facsimile transmission to the destination address.

* * * * *